US011109411B2

(12) United States Patent
Li et al.

(10) Patent No.: US 11,109,411 B2
(45) Date of Patent: Aug. 31, 2021

(54) CHANNEL SENSE METHOD, NETWORK SIDE DEVICE, AND TERMINAL

(71) Applicant: Huawei Technologies Co., Ltd., Shenzhen (CN)

(72) Inventors: Yanchun Li, Boulogne Billancourt (FR); Mengyao Ma, Shenzhen (CN); Min Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 16/692,609

(22) Filed: Nov. 22, 2019

(65) Prior Publication Data

US 2020/0092911 A1  Mar. 19, 2020

Related U.S. Application Data

(63) Continuation of application No. PCT/CN2018/088237, filed on May 24, 2018.

(30) Foreign Application Priority Data

May 24, 2017 (CN) .......................... 201710372917.8

(51) Int. Cl.
*H04W 74/08* (2009.01)
*H04W 74/00* (2009.01)

(52) U.S. Cl.
CPC ..... *H04W 74/0808* (2013.01); *H04W 74/006* (2013.01)

(58) Field of Classification Search
CPC .................... H04W 74/006; H04W 74/0808
See application file for complete search history.

(56) References Cited

U.S. PATENT DOCUMENTS

2010/0008318 A1  1/2010 Wentink et al.
2014/0119314 A1* 5/2014 Pajukoski ............. H04L 5/0037
370/329
(Continued)

FOREIGN PATENT DOCUMENTS

CN    102090126 A   6/2011
CN    105101283 A   11/2015
(Continued)

OTHER PUBLICATIONS

Machine Translation and Abstract of Chinese Publication No. CN105611639, dated May 25, 2016, 20 pages.
(Continued)

*Primary Examiner* — Kashif Siddiqui
(74) *Attorney, Agent, or Firm* — Conley Rose, P.C.

(57) ABSTRACT

A channel sense method, a network side device, and a terminal includes determining, by a network side device, a first sense resource used by a terminal to perform channel sense, where the first sense resource is another resource other than a resource in a cell in which the terminal is located and that is used by each terminal to perform data transmission; and sending first sense indication information to the terminal, where the first sense indication information is used to indicate the first sense resource. When the terminal performs sense on the first sense resource, another terminal in a same cell does not receive or send data on the first sense resource. If the terminal senses an interference signal, it can be determined that the interference signal is not an interference signal generated when the other terminal in this cell performs data transmission.

20 Claims, 9 Drawing Sheets

(56) References Cited

U.S. PATENT DOCUMENTS

| | | | |
|---|---|---|---|
| 2016/0278120 A1* | 9/2016 | Ro | H04W 72/0406 |
| 2017/0085326 A1 | 3/2017 | Li et al. | |
| 2018/0110057 A1 | 4/2018 | Park et al. | |
| 2018/0279347 A1 | 9/2018 | Wang et al. | |
| 2019/0037546 A1* | 1/2019 | You | H04W 72/1289 |

FOREIGN PATENT DOCUMENTS

| | | |
|---|---|---|
| CN | 105208668 A | 12/2015 |
| CN | 105611639 A | 5/2016 |
| CN | 105636206 A | 6/2016 |
| CN | 106559844 A | 4/2017 |
| EP | 3355614 A1 | 8/2018 |
| JP | 2009253911 A | 10/2009 |
| WO | 2015116159 A1 | 8/2015 |
| WO | 2015185989 A2 | 12/2015 |
| WO | 2016167623 A1 | 10/2016 |
| WO | 2017050087 A1 | 3/2017 |

OTHER PUBLICATIONS

Foreign Communication From a Counterpart Application, PCT Application No. PCT/CN2018/088237, English Translation of International Search Report dated Jul. 25, 2018, 2 pages.

Foreign Communication From a Counterpart Application, PCT Application No. PCT/CN2018/088237, English Translation of Written Opinion dated Jul. 25, 2018, 3 pages.

* cited by examiner

CHANNEL SENSE METHOD, NETWORK SIDE DEVICE, AND TERMINAL

CROSS-REFERENCE TO RELATED APPLICATIONS

This application is a continuation application of International Application No. PCT/CN2018/088237, filed on May 24, 2018, which claims priority to Chinese Patent Application No. 201710372917.8, filed on May 24, 2017. The disclosures of the aforementioned applications are hereby incorporated by reference in their entireties.

TECHNICAL FIELD

This application relates to the field of wireless communications technologies, and in particular, to a channel sense method, a network side device, and a terminal.

BACKGROUND

Carrier sense (CS), also referred to as channel sense, refers to a process in which a terminal performs, before initiating data transmission to a network side device, sense on a frequency domain resource corresponding to the data transmission.

In a related technology, a network side device schedules, for a terminal, a transmission resource used for data transmission. When performing sense, the terminal senses, before time domain corresponding to the transmission resource scheduled by the network side device, a status of channel interference in frequency domain corresponding to the transmission resource; and when sensing that the channel interference exists in the corresponding frequency domain, the terminal gives up the data transmission. Correspondingly, when sensing that the channel interference does not exist in corresponding frequency domain (for example, a channel is idle), the terminal performs data transmission on the transmission resource.

In an embodiment application, when a terminal performs channel sense, a sensed resource may be allocated by a network side device to another terminal in a same cell to perform data transmission. The channel sense performed by the terminal may be interfered with by the data transmission performed by the other terminal in the same cell, leading to relatively low accuracy of a sense result.

SUMMARY

To improve accuracy of a sense result, embodiments of this application provide a channel sense method, a network side device, and a terminal.

According to a first aspect, a channel sense method is provided. The method includes determining, by a network side device, a first sense resource used by a terminal to perform channel sense, where the first sense resource is another resource other than a resource that is in a cell in which the terminal is located and that is used by each terminal to perform data transmission; and sending, by the network side device, first sense indication information to the terminal, where the first sense indication information is used to indicate the first sense resource.

In the method shown in the first aspect, the network side device determines a sense resource used by the terminal to perform channel sense, and the determined sense resource is the other resource other than the resource that is in the cell in which the terminal is located and that is used by each terminal to perform data transmission. In other words, after the network side device allocates a resource to the terminal to perform sense, the resource is no longer allocated to another terminal in a same cell to perform data transmission. In this way, it can be ensured that an interference signal sensed by the terminal on the sense resource is definitely an interference signal from a neighboring cell rather than an interference signal generated when the other terminal in this cell performs data transmission, to prevent the channel sense performed by the terminal from being interfered with by the data transmission performed by the other terminal in the same cell, and improve accuracy of a sense result.

In a possible design, the first sense indication information includes one or more timeslots occupied by the first sense resource; or the first sense indication information includes start time and duration of the first sense resource.

In a possible design, the first sense indication information is further used to indicate a first transmission resource used by the terminal to perform data transmission, a time domain interval of the first transmission resource is after a time domain interval of the first sense resource, and a frequency domain resource occupied by the first transmission resource is all or a part of a frequency domain resource occupied by the first sense resource.

In a possible design, the first sense indication information is further used to obtain a channel sense result of the terminal; and the method further includes receiving, by the network side device, a channel sense result sent by the terminal, where the channel sense result is a channel sense result corresponding to the terminal on the first sense resource.

In a possible design, the channel sense result includes at least one of a channel busy report and a channel idle report; the channel busy report includes at least one of sensed signal strength, signal power, duration, a number of a beam/sector on/in which a signal is sensed, and a number of an antenna on which a signal is sensed; and the channel idle report includes at least one of a number of an idle beam/sector and a number of an idle antenna.

In a possible design, the method further includes, after receiving the channel sense result, determining, by the network side device, a second transmission resource used by the terminal to perform data transmission; and sending, by the network side device, transmission indication information to the terminal, where the transmission indication information is used to indicate the second transmission resource.

In the foregoing possible design solutions, the network side device may receive a channel sense result fed back by the terminal, and allocate a transmission resource to the terminal based on the channel sense result, to prevent a data transmission process performed by the terminal from being affected by data transmission process in a neighboring cell as much as possible, and improve a data transmission effect.

In a possible design, the method further includes, after receiving the channel sense result, determining, by the network side device, a second sense resource used by the terminal to perform channel sense and a second transmission resource used by the terminal to perform data transmission, where a time domain interval of the second transmission resource is after a time domain interval of the second sense resource, and a frequency domain resource occupied by the second transmission resource is all or a part of a frequency domain resource occupied by the second sense resource; and sending, by the network side device, second sense indication information to the terminal, where the second sense indication information is used to indicate the second sense resource and the second transmission resource.

In the foregoing possible design solution, the network side device receives the channel sense result fed back by the terminal, and allocates a resource used for further sense and the data transmission to the terminal, to improve a resource allocation effect.

In a possible design, the method further includes, before the determining, by a network side device, a first sense resource used by a terminal to perform channel sense, obtaining sense capability information of the terminal, where the sense capability information includes at least one of a frequency domain resource that can be sensed and duration required for single sense; and the determining, by a network side device, a first sense resource used by a terminal to perform channel sense includes determining, by the network side device, the first sense resource based on the sense capability information of the terminal.

In the foregoing possible design solution, the terminal provides the network side device with the sense capability information of the terminal, and the network side device allocates the sense resource to the terminal based on the sense capability information of the terminal, to improve an allocation effect of the sense resource.

In a possible design, the first sense resource includes a time domain resource and a frequency domain resource; or the first sense resource includes a time domain resource, a frequency domain resource, and a sense direction.

According to a second aspect, a channel sense method is provided. The method includes receiving, by a terminal, first sense indication information sent by a network side device, where the first sense indication information is used to indicate a first sense resource, and the first sense resource is another resource other than a resource that is in a cell in which the terminal is located and that is used by each terminal to perform data transmission; and obtaining, by the terminal, a corresponding channel sense result on the first sense resource.

In a possible design, the first sense indication information is further used to indicate a first transmission resource used by the terminal to perform data transmission, a time domain interval of the first transmission resource is after a time domain interval of the first sense resource, and a frequency domain resource occupied by the first transmission resource is all or a part of a frequency domain resource occupied by the first sense resource; and the method further includes determining, by the terminal based on the channel sense result, an idle frequency domain resource corresponding to the first transmission resource; and performing, by the terminal in a time domain interval corresponding to the first transmission resource, data transmission on the idle frequency domain resource.

In a possible design, the first sense indication information is further used to obtain the channel sense result; and the method further includes determining, by the terminal based on the channel sense result, an idle frequency domain resource corresponding to the first sense resource; and sending, by the terminal after a time domain interval corresponding to the first sense resource, the channel sense result to the network side device on the idle frequency domain resource corresponding to the first sense resource.

In a possible design, the method further includes receiving, by the terminal, transmission indication information sent by the network side device, where the transmission indication information is used to indicate a second transmission resource determined after the network side device receives the channel sense result; and performing, by the terminal, data transmission on the second transmission resource.

In a possible design, the method further includes receiving, by the terminal, second sense indication information sent by the network side device, where the second sense indication information is used to indicate a second sense resource and a second transmission resource that are determined after the network side device receives the channel sense result, a time domain interval of the second transmission resource is after a time domain interval of the second sense resource, and a frequency domain resource occupied by the second transmission resource is all or a part of a frequency domain resource occupied by the second sense resource; determining, by the terminal based on a sense result of performing channel sense on the second sense resource, an idle frequency domain resource corresponding to the second sense resource; and performing, by the terminal in a time domain interval corresponding to the second transmission resource, data transmission on the idle frequency domain resource.

In a possible design, before the receiving, by a terminal, first sense indication information sent by a network side device, the method further includes sending, by the terminal, sense capability information of the terminal to the network side device, where the sense capability information includes at least one of a channel interval that can be sensed and duration required for single sense.

In a possible design, the channel sense result is a sense result obtained by performing, by the terminal, channel sense on the first sense resource; or the channel sense result is a sense result obtained by performing, by the terminal before the time domain interval corresponding to the first sense resource, channel sense on the frequency domain resource occupied by the first sense resource.

In the foregoing possible design solutions, before receiving the first sense resource, the terminal performs channel sense in advance, and after receiving the first sense resource, may obtain a sense result that is sensed in advance and corresponds to the first sense resource, to improve timeliness of obtaining the sense result.

According to a third aspect, a network side device is provided. The network side device includes a processor and a communications interface, where the communications interface is configured to be controlled by the processor, and the processor is configured to implement the channel sense method provided in the first aspect and the possible design solutions of the first aspect.

According to a fourth aspect, a terminal is provided. The terminal includes a processor and a communications interface, where the communications interface is configured to be controlled by the processor, and the processor in the terminal is configured to implement the channel sense method provided in the second aspect and the possible design solutions of the second aspect.

According to a fifth aspect, this application provides a network side device. The network side device has a function of implementing the channel sense method in the first aspect. The function may be implemented by hardware, or may be implemented by hardware by executing corresponding software. The hardware or the software includes one or more units corresponding to the foregoing function.

According to a sixth aspect, this application provides a terminal. The terminal has a function of implementing the channel sense method in the second aspect. The function may be implemented by hardware, or may be implemented by hardware by executing corresponding software. The hardware or the software includes one or more units corresponding to the foregoing function.

According to a seventh aspect, a computer readable storage medium is provided. The computer readable storage medium stores an executable program, and the executable program may be used to implement the channel sense method provided in the first aspect and the possible design solutions of the first aspect, or the executable program may be used to implement the channel sense method provided in the second aspect and the possible design solutions of the second aspect.

DESCRIPTION OF EMBODIMENTS

To make the objectives, technical solutions, and advantages of this application clearer, the following further describes the implementations of this application in detail with reference to the accompanying drawings.

Figure 1:
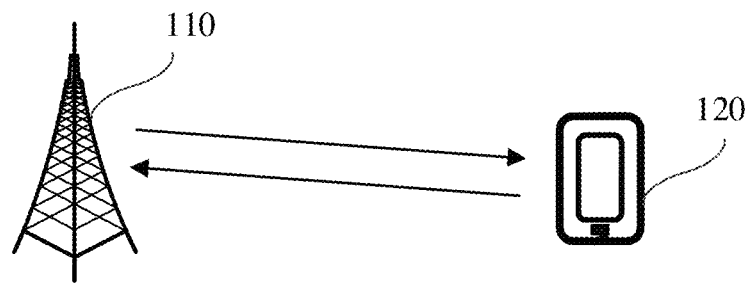
FIG. 1 is an architectural diagram of a wireless communications system according to an embodiment of this application.

FIG. 1 is an architectural diagram of a wireless communications system according to an embodiment of this application. The wireless communications system may be a wireless local area network (WLAN) system. Alternatively, the wireless communications system may be a 4th generation mobile communication technology (4G) system, also referred to as a long term evolution (LTE) system. Alternatively, the wireless communications system may be a 5G system, also referred to as a new radio (NR) system. The wireless communications system includes a network side device 110 and a terminal 120.

The network side device 110 may be an access point (AP) or a transmission reception point (TRP) in a wireless local area network. Alternatively, the network side device 110 may be an evolved NodeB (eNB) used in a 4G system. Alternatively, the network side device 110 may be a next generation NodeB (gNB) that uses a centralized distributed architecture in the 5G system. When using a centralized distributed architecture, the network side device 110 generally includes a centralized unit (centralized unit, CU) and at least two distributed units (DU). Protocol stacks of a packet data convergence protocol (PDCP) layer, a radio link control (RLC) layer, and a media access control (MAC) layer are provided in the centralized unit. A protocol stack of a physical (PHY) layer is provided in the distributed unit, and a specific implementation of the network side device 110 is not limited in this embodiment of this application.

The network side device 110 and the terminal 120 establish a wireless connection through a wireless air interface. In different implementations, the wireless air interface is a wireless air interface based on a 4th generation mobile communications network technology (4G) standard. Alternatively, the wireless air interface is a wireless air interface based on a 5th generation mobile communications network technology (5G) standard, for example, the wireless air interface is an interface in new radio. Alternatively, the wireless air interface may be a wireless air interface based on a next generation mobile communications network technology standard of 5G.

The terminal 120 may refer to a device that provides voice and/or data connectivity for a user. The terminal 120 may communicate with one or more core networks using a radio access network (RAN). The terminal 120 may be a mobile terminal, such as a mobile phone (or referred to as a "cellular" phone) and a computer with a mobile terminal, for example, may be a portable, pocket-sized, handheld, computer built-in, or vehicle-mounted mobile apparatus. For example, the terminal 120 may be a station (STA), a subscriber unit, a subscriber station, a mobile station, a mobile, a remote station, an access point, a remote terminal, an access terminal, a user apparatus, a user agent, a user device, or a user equipment (UE).

It should be noted that the wireless communications system shown in FIG. 1 may include a plurality of network side devices 110 and/or a plurality of terminals 120. One network side device 110 and one terminal 120 are shown in FIG. 1 as an example for description. However, this is not limited in this embodiment.

In this embodiment of this application, the network side device 110 determines, for the terminal 120, a sense resource used to perform channel sense, and the sense resource determined by the network side device 110 for the terminal 120 is another resource other than a resource that is allocated by the network side device 110 to each terminal, which is in a same cell as the terminal 120, and that is used for data transmission. To be specific, when the terminal 120 performs sense on the sense resource, another terminal in the same cell does not receive or send data on the sense resource. If the terminal 120 senses an interference signal, it can be determined that the interference signal is not an interference signal generated when the other terminal in this cell performs data transmission. Therefore, the channel sense performed by the terminal can be prevented from being interfered with by the data transmission performed by the other terminal in the same cell, thereby improving accuracy of a sense result.

Figure 2:
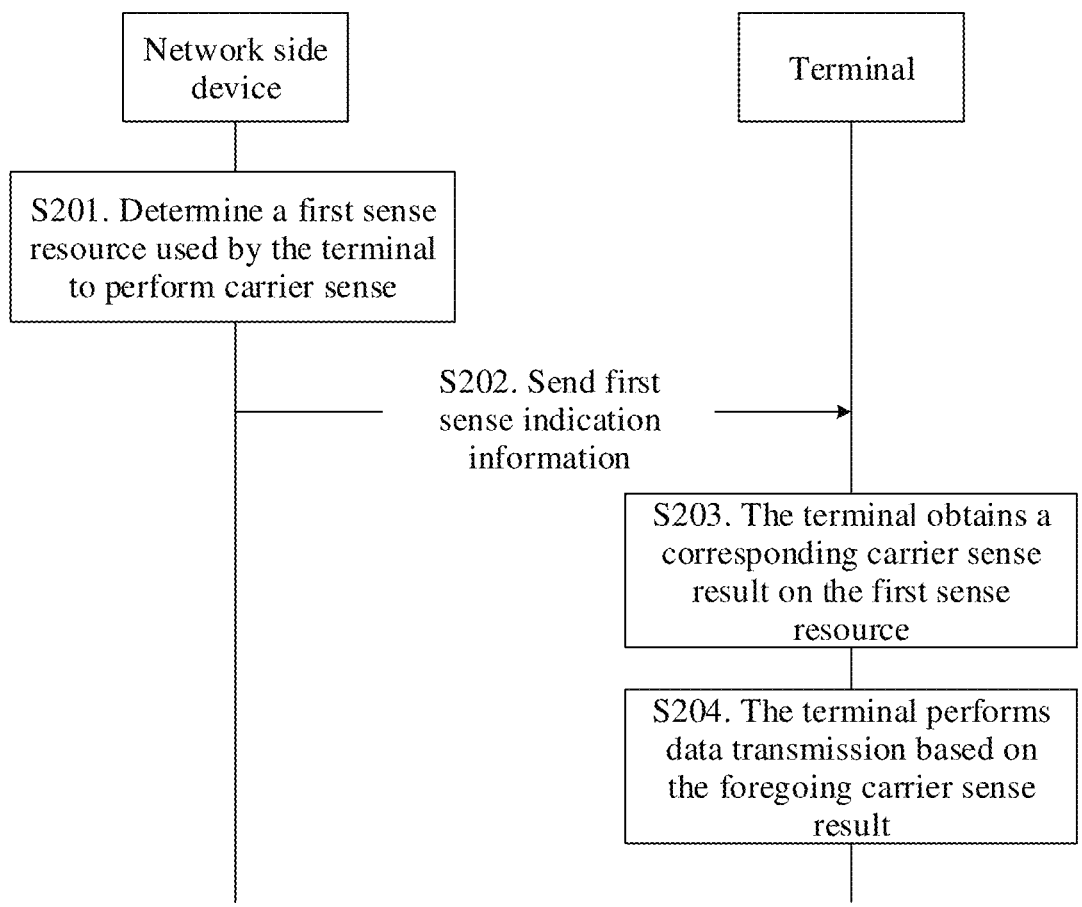
FIG. 2 is a flowchart of a channel sense method according to an example embodiment of this application.

FIG. 2 is a flowchart of a channel sense method according to an example embodiment of this application. The method may be applied to the wireless communications system shown in FIG. 1. As shown in FIG. 2, the channel sense method may include the following steps.

Step 201: A network side device determines a first sense resource used by a terminal to perform channel sense, where the first sense resource is another resource other than a resource that is in a cell in which the terminal is located and that is used by each terminal to perform data transmission.

In this embodiment of this application, when needing to perform channel sense, the terminal may send a channel sense request (CS request) to the network side device. After receiving the channel sense request, the network side device may determine the first sense resource for the terminal.

When determining the first sense resource for the terminal, the network side device may determine the first sense resource for the terminal from the other resource other than a resource that is in the cell in which the terminal is located and that is used by each terminal to perform data transmission, and in addition, the network side device does not subsequently allocate the first sense resource to each terminal in the cell in which the terminal is located to perform data transmission.

In a possible design, the first sense resource includes a time domain resource and a frequency domain resource.

In this embodiment of this application, the network side device may determine, for the terminal, the time domain resource (for example, a time period of the sense) and the frequency domain resource (the frequency domain resource may be a frequency band, a channel, a subchannel, or the like for the sense) that are used for channel sense. Subsequently, when performing channel sense, the terminal performs channel sense in a specified time domain interval and on a specified frequency domain resource.

In a possible design, the first sense resource includes the time domain resource, the frequency domain resource, and a sense direction.

Beamforming is one of key technologies introduced in the 5G system. The beamforming means that specific weights are assigned for a plurality of transmit antennas such that signals transmitted by the plurality of antennas are superimposed on each other, to form specific spatial directivity. In the 5G system, a sending device may simultaneously send beam signals to a plurality of receiving devices using different beams, to implement reuse (namely, spatial multiplexing) of a same time-frequency resource in different spaces, and greatly increase a system capacity. In this embodiment of this application, if the network side device communicates with the terminal using a beamforming technology, when the terminal performs channel sense, in addition to needing to perform sense on an available frequency domain resource, the terminal needs to perform sense in a fixed direction. Therefore, when the method shown in this embodiment of this application is used in the 5G system, the first sense resource determined by the network side device further includes the sense direction in addition to the time domain resource and the frequency domain resource.

In a possible design, the terminal may send sense capability information of the terminal to the network side device, and the sense capability information includes at least one of a frequency domain resource that can be sensed and duration required for single sense. When determining the first sense resource, the network side device may obtain the sense capability information of the terminal, and determine the first sense resource based on the sense capability information of the terminal.

Different terminals have different channel sense capabilities. For example, a terminal supports a relatively wide frequency band, but another terminal supports only a relatively narrow frequency band; or a terminal supports a frequency band, but another terminal supports another frequency band. For an example, a terminal with a relatively high processing capability may implement one channel sense in four timeslots, but another terminal with a relatively low processing capability needs seven or more timeslots to implement one channel sense. If a frequency band of a sense resource allocated by the network side device to the terminal includes excessive frequency bands that cannot be sensed by the terminal, or duration corresponding to a sense resource allocated by the network side device to the terminal is too long, the allocated resource is wasted. If the frequency band of the sense resource that is determined by the network side device for the terminal does not include or includes a few frequency bands that can be sensed by the terminal, or duration corresponding to the sense resource determined by the network side device for the terminal is too short to support the terminal in implementing the channel sense, a sense effect of the terminal is affected. Therefore, to improve an allocation effect and resource utilization of the sense resource, in this embodiment of this application, when determining the first sense resource for the terminal, the network side device may obtain the sense capability information of the terminal, to be specific, a frequency band that can be sensed by the terminal and/or the duration required for single sense, and determines the first sense resource for the terminal based on the sense capability information of the terminal. For example, the frequency band of the sense resource determined by the network side device for the terminal is the frequency band that can be sensed by the terminal, and the duration of the allocated sense resource is enough for the terminal to implement the channel sense without exceeding too much.

In a possible design, the terminal may add the sense capability information of the terminal to the foregoing channel sense request, or the terminal may send the sense capability information of the terminal to the network side device when accessing the network side device.

Because the first sense resource is not allocated to a terminal in a same cell to perform data transmission, it is required to ensure that a resource on a same frequency band after the first sense resource can be preempted by another cell. Therefore, a length of a time domain interval of the first sense resource may be less than a minimum interval time of channel contention.

Step 202: The network side device sends first sense indication information to the terminal, and the terminal receives the first sense indication information, where the first sense indication information is used to indicate the first sense resource.

The network side device may generate the first sense indication information based on the determined first sense resource.

In a possible design, the first sense indication information includes one or more timeslots occupied by the first sense resource; or the first sense indication information includes start time and duration of the first sense resource.

Information that is in the first sense indication information and that is used to indicate the time domain interval of the first sense resource may be an offset in time domain and a length in time domain. Further, for example, it is assumed that a length of a unit time slice needs to be consumed by the terminal to perform one sense, and the terminal needs to perform one or more times of the sense on the first sense resource (for example, when the sense needs to be performed in a plurality of directions, a plurality of times of the sense are performed), the first sense indication information may include an offset N of a start time slice of the first sense resource and a quantity M of unit time slices (to be specific, a start time slice corresponding to the first sense resource is an Nth unit time slice after a unit time slice in which the first sense indication information is located, and the first sense resource lasts M unit time slices). The length of the foregoing unit time slice may be a user-defined fixed time length. For example, the length of a unit time slice may be a fixed quantity of orthogonal frequency division multiplexing (OFDM) symbols length or timeslots.

Alternatively, in this embodiment of this application, the time domain interval of the first sense resource may be directly indicated using a timeslot offset and a timeslot quantity (or an OFDM symbol offset and an OFDM symbol quantity). For example, the first sense indication information may include a symbol offset n and a symbol quantity m of the first sense resource (to be specific, a start symbol corresponding to the first sense resource is an nth OFDM symbol after an OFDM symbol in which the first sense indication information is located, and the first sense resource lasts m OFDM symbols).

In a possible design, a time domain resource that is in the first sense indication information and that is occupied to indicate the first sense resource may be a frequency band (frequency domain range), a channel number, a sub-channel number, or the like.

In a possible design, when the first sense resource further includes the sense direction, information that is in the first sense indication information and that is used to indicate the sense direction is sector information or beam direction information that is used by the network side device to schedule the terminal to perform uplink transmission. The beam direction information may be a transmit beam direction in which the terminal sends a signal, or may be a receive beam direction when the network side device receives information sent by the terminal. The beam direction may be omnidirectional, to be specific, includes all possible directions. Alternatively, the beam direction may be directional, to be specific, includes only some possible directions.

Step 203: The terminal obtains a corresponding channel sense result on the first sense resource.

In a possible design, the channel sense result includes at least one of a channel busy report and a channel idle report; the channel busy report includes at least one of sensed signal strength, signal power, duration, a number of a beam/sector on/in which a signal is sensed, and a number of an antenna on which a signal is sensed; and the channel idle report includes at least one of a number of an idle beam/sector and a number of an idle antenna.

A sense result obtained by the terminal may be a sense result obtained by performing, by the terminal, channel sense on the first sense resource.

For example, after receiving the first sense indication information, the terminal performs channel sense on the first sense resource indicated by the first sense indication information.

Further, for example, when the first sense resource includes the time domain resource and the frequency domain resource, in a time domain interval corresponding to the first sense resource, the terminal listens to signal strength on a frequency domain resource corresponding to the first sense resource, and when signal strength on a frequency domain resource meets a preset condition (for example, the signal strength is greater than a preset strength threshold), it is determined that an interference signal exists on the frequency domain resource, which may be because a network side device and a terminal in a neighboring cell are communicating using the frequency domain resource. Correspondingly, if the signal strength on the frequency domain resource does not meet the preset condition (for example, the signal strength is not greater than the preset strength threshold), it indicates that no interference signal exists on the frequency domain resource, to be specific, the frequency domain resource is an idle frequency domain resource.

In addition, when the first sense resource further includes the sense direction, the terminal may select a proper sense manner based on a sense purpose (to be specific, a specific transmission type of the data transmission that needs to be performed subsequently).

For example, when the sense purpose is uplink data sending, the sense direction is generally one or more narrow beam directions. In this case, the terminal may perform channel sense in the one or more narrow beam directions indicated by the sense direction.

Figure 3A:
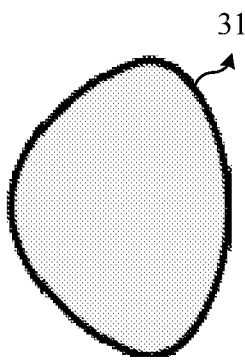
FIG. 3A is a schematic diagram of multi-level sense according to the embodiment shown in FIG. 2.
Figure 3B:
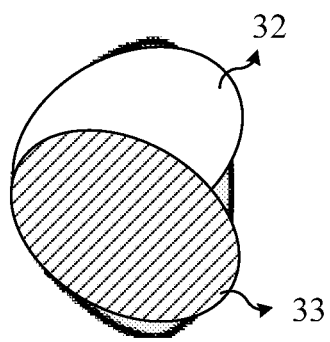
FIG. 3B is a schematic diagram of multi-level sense according to the embodiment shown in FIG. 2.
Figure 3D:
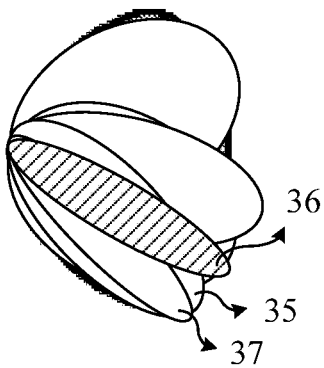
FIG. 3D is a schematic diagram of multi-level sense according to the embodiment shown in FIG. 2.
Figure 3C:
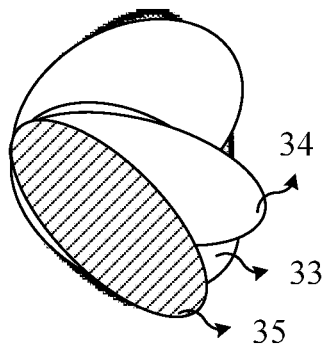
FIG. 3C is a schematic diagram of multi-level sense according to the embodiment shown in FIG. 2.

Alternatively, when the sense purpose is uplink beam training, the sense direction is generally a relatively broad direction (for example, a sector). In this case, the terminal may determine, in a multi-level sense manner, an idle direction or an interference direction of the frequency domain resource corresponding to the first sense resource. For example, FIGS. 3A-3D are schematic diagrams of multi-level sense according to an embodiment of this application. In an example, a terminal determines an interference direction through sense. In FIG. 3A, a sense direction indicated by first sense indication information is a sector 31. When performing level-1 sense, the terminal divides the sector 31 into a plurality of sense directions (two sense directions are shown in FIG. 3B, such as a sense direction 32 and a sense direction 33), and then separately performs channel sense in the sense direction 32 and the sense direction 33, to determine which direction is an interference direction. For example, in FIG. 3B, the terminal determines, through sense, that the sense direction 33 is an interference direction but the sense direction 32 is an idle direction. Then, the terminal performs level-2 sense on the sense direction 33, to be specific, divides the sense direction 33 into a plurality of sense directions (two sense directions are shown in FIG. 3C such as a sense direction 34 and a sense direction 35), and then separately performs channel sense in the sense direction 34 and the sense direction 35, to determine which direction is an interference direction. For example, in FIG. 3C, the terminal determines, through sense, that the sense direction 35 is an interference direction but the sense direction 34 is an idle direction. Finally, the terminal performs level-3 sense on the sense direction 35, to be specific, divides the sense direction 35 into a plurality of sense directions (two sense directions are shown in FIG. 3D such as a sense direction 36 and a sense direction 37), and then separately performs channel sense in the sense direction 36 and the sense direction 37, to determine which direction is an interference direction. For example, in FIG. 3D, the terminal determines, through sense, that the sense direction 36 is an interference direction but the sense direction 37 is an idle direction.

In a possible design, the foregoing channel sense result is a sense result obtained by performing, by the terminal before the time domain interval corresponding to the first sense resource, channel sense on a frequency domain resource occupied by the first sense resource.

In this embodiment of this application, to obtain the sense result as quickly as possible after receiving the first sense indication information, the terminal may select, before receiving the first sense indication information, to perform channel sense on some or all of available resources and cache the sense result. When the terminal receives the first sense indication information, it may be determined whether all or a part of the first sense resource is sensed in a predetermined time period before the first sense indication information is received (for example, a plurality of unit time slices, timeslots, or OFDM symbols before the first sense indication information is received). If all or a part of the first sense resource is sensed, a sense result of a sensed resource in the first sense resource is obtained. If the first sense resource further includes a resource that is not sensed in the foregoing predetermined time period, the terminal performs channel sense on the foregoing resource that is not sensed.

Step 204: The terminal performs data transmission based on the foregoing channel sense result.

In this embodiment of this application, the data transmission performed by the terminal may be sending uplink data to the network side device. Alternatively, when a solution shown in this embodiment of this application is used in the 5G system, in addition to sending uplink data to the network side device, the foregoing data transmission may be performing the uplink beam training.

In this embodiment of this application, after the terminal obtains the channel sense result, based on the channel sense result, an idle frequency domain resource may be determined, or an idle direction and an idle frequency domain resource may be determined. Then, the terminal performs uplink data transmission on the determined idle frequency domain resource, or in the determined idle direction and on the determined idle frequency domain resource.

In a possible design, in addition to indicating the first sense resource, the first sense indication information indicates a first transmission resource used by the terminal to perform data transmission. A time domain interval of the first transmission resource is after a time domain interval of the first sense resource, and a frequency domain resource occupied by the first transmission resource is all or a part of a frequency domain resource occupied by the first sense resource. The terminal determines, based on the channel sense result, an idle frequency domain resource corresponding to the first transmission resource, and performs, in a time domain interval corresponding to the first transmission resource, data transmission on the idle frequency domain resource.

In a possible design, if a method shown in this embodiment of this application is applied to the 5G system, when performing data transmission on the first transmission resource, the terminal performs, in the time domain interval corresponding to the first transmission resource, data transmission on an idle frequency domain resource in an idle direction corresponding to the sense result.

In a possible design, the foregoing data transmission may be sending uplink data, for example, sending an uplink physical layer protocol data unit (physical layer protocol data unit, PPDU). Alternatively, the foregoing data transmission may be performing the uplink beam training.

When performing the uplink beam training, the terminal may perform beam training in a plurality of directions. In this embodiment of this application, when the data transmission is the uplink beam training, the terminal may first perform beam sense in each sense direction, and select, based on a sense result, to perform the uplink beam training in an idle direction. Alternatively, the terminal may sequentially perform sense and uplink beam training in each sense direction. For example, after performing sense in a sense direction, the terminal determines, based on a sense result, whether to perform beam training in the sense direction. Further, when the sense direction is an idle direction, the terminal performs uplink beam training in the sense direction, and after completing the uplink beam training in the sense direction, performs channel sense in a next sense direction. Alternatively, when the sense direction is an interference direction, the terminal gives up performing uplink beam training in the sense direction, and goes to a next sense direction to perform channel sense.

Figure 4:
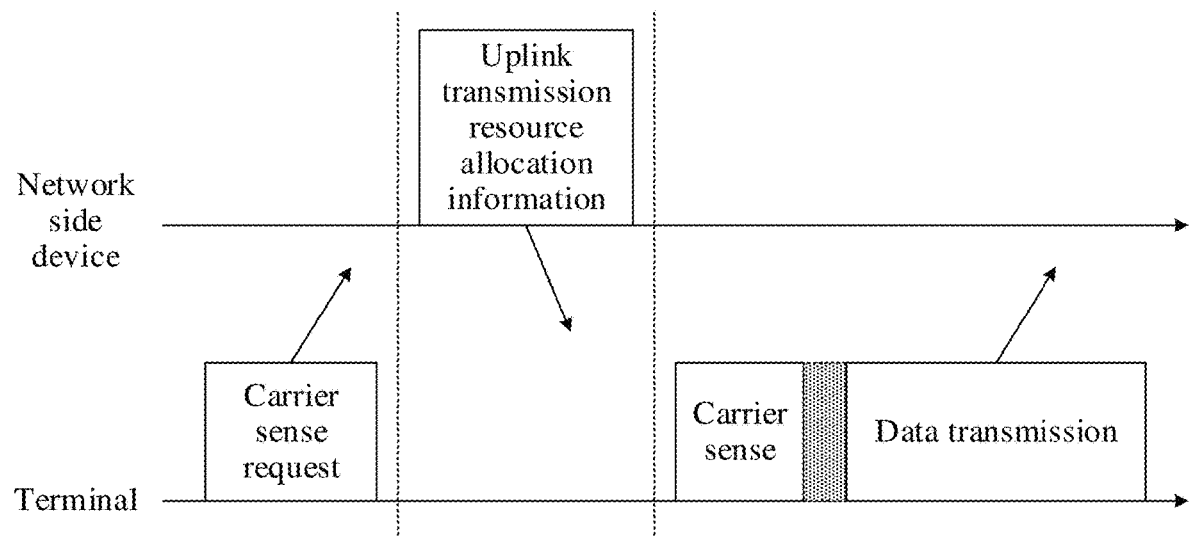
FIG. 4 is a schematic diagram of sense and transmission according to the embodiment shown in FIG. 2.

FIG. 4 is a schematic diagram of sense and transmission according to an embodiment of this application. As shown in FIG. 4, when accessing a network side device, a terminal sends, to the network side device, a frequency domain resource that can be sensed by the terminal and duration required for single sense. Subsequently, when needing to perform data transmission, the terminal sends a channel sense request to the network side device. After receiving the channel sense request, the network side device obtains the frequency domain resource that can be sensed by the terminal and the duration required for single sense, and determines a sense resource 1 and a transmission resource 1 based on the frequency domain resource that can be sensed by the terminal and the duration required for single sense. The sense resource 1 and the transmission resource 1 correspond to a same frequency domain resource, and the sense resource 1 is before the transmission resource 1. In addition, the sense resource 1 is not a resource allocated by the network side device to each terminal in the cell in which the terminal is located to perform data transmission. The network side device notifies, using uplink transmission resource allocation information (up link allocation or UL allocation), the terminal that the sense resource 1 is before the transmission resource 1. After receiving the uplink transmission resource allocation information, the terminal performs channel sense on the sense resource, and determines, based on a sense result, an idle frequency domain resource on a frequency domain resource corresponding to the sense resource, and performs, in a time domain interval corresponding to the transmission resource 1, data transmission on the idle frequency domain resource.

In conclusion, in a channel sense method shown in this embodiment of this application, the network side device determines, for the terminal, a sense resource used to perform channel sense, and the sense resource determined by the network side device for the terminal is another resource other than a resource that is allocated by the network side device to each terminal, which is in a same cell as the terminal, and that is used for the data transmission. To be specific, when the terminal performs sense on the sense resource, another terminal in a same cell does not receive or send data on the sense resource. If the terminal senses an interference signal, it can be determined that the interference signal is not an interference signal generated when the other terminal in this cell performs data transmission. Therefore, the channel sense performed by the terminal can be prevented from being interfered with by the data transmission performed by the other terminal in the same cell, thereby improving accuracy of a sense result.

In a possible implementation, the terminal may send the sense result to the network side device. After receiving the sense result, the network side device determines, for the terminal with reference to the sense result, a resource used for the data transmission, to improve accuracy of allocating, by the network side device, the resource used for the data transmission.

Figure 5:
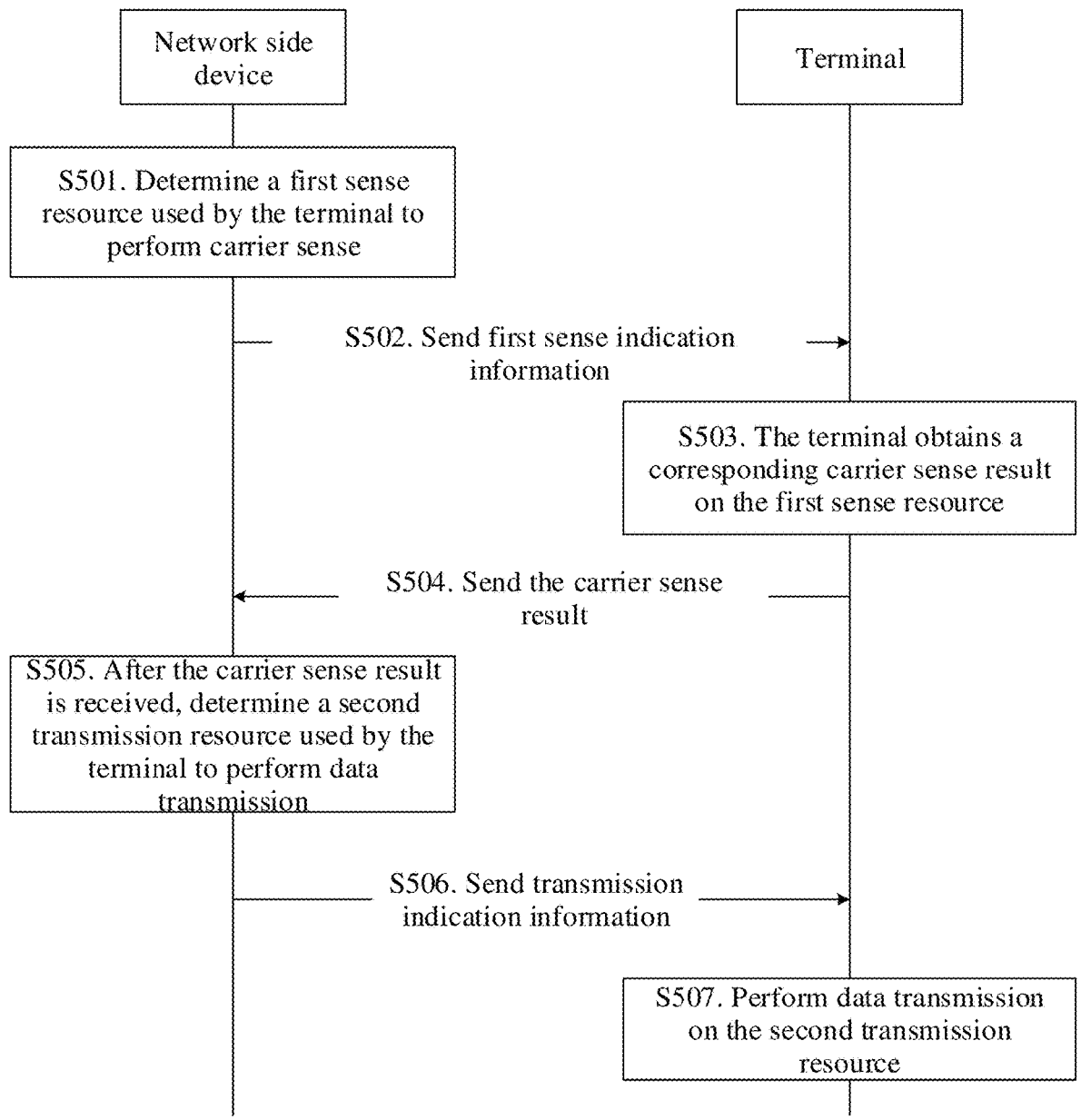
FIG. 5 is a flowchart of a channel sense method according to an example embodiment of this application.

FIG. 5 is a flowchart of a channel sense method according to an example embodiment of this application. The method may be applied to the wireless communications system shown in FIG. 1. As shown in FIG. 5, the channel sense method may include the following steps.

Step 501: A network side device determines a first sense resource used by a terminal to perform channel sense, where the first sense resource is another resource other than a resource that is in a cell in which the terminal is located and that is used by each terminal to perform data transmission.

Step 502: The network side device sends first sense indication information to the terminal, and the terminal receives the first sense indication information, where the first sense indication information is used to indicate the first sense resource.

Step 503: The terminal obtains a corresponding channel sense result on the first sense resource.

For implementation processes of step 501 to the foregoing step 503, refer to descriptions of step 201 to step 203 in the embodiment shown in FIG. 2. Details are not described herein again.

Step 504: The terminal sends the channel sense result to the network side device, and the network side device receives the channel sense result.

In a possible design, the first sense indication information is further used to obtain the channel sense result. The terminal determines, with reference to the channel sense result, an idle frequency domain resource corresponding to the first sense resource, and after a time domain interval corresponding to the first sense resource, sends the channel sense result to the network side device on the idle frequency domain resource corresponding to the first sense resource.

Step 505: After receiving the channel sense result, the network side device determines a second transmission resource used by the terminal to perform data transmission.

In a possible design, the channel sense result includes at least one of a channel busy report and a channel idle report; the channel busy report includes at least one of sensed signal strength, signal power, duration, a number of a beam/sector on/in which a signal is sensed, and a number of an antenna on which a signal is sensed; and the channel idle report includes at least one of a number of an idle beam/sector and a number of an idle antenna. Correspondingly, the network side device may allocate the second transmission resource to the terminal with reference to the foregoing channel idle report.

Step 506: The network side device sends transmission indication information to the terminal, where the transmission indication information is used to indicate the second transmission resource.

In a possible design, the network side device may add the transmission indication information using control information sent by a downlink.

Step 507: The terminal performs data transmission on the second transmission resource.

After receiving the foregoing transmission indication information, the terminal does not need to perform channel sense before the second transmission resource, and may directly perform data transmission on the second transmission resource, for example, perform uplink data sending or uplink beam training.

Figure 6:
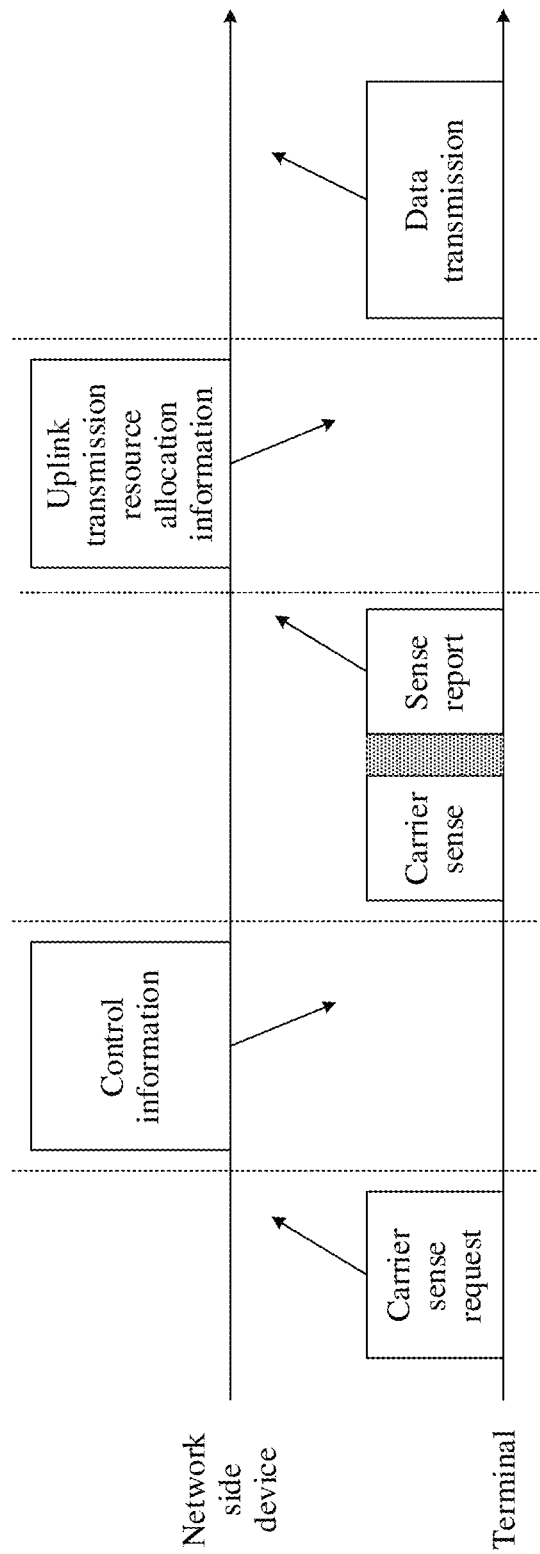
FIG. 6 is a schematic diagram of sense and transmission according to the embodiment shown in FIG. 5.

FIG. 6 is a schematic diagram of sense and transmission according to an embodiment of this application. As shown in FIG. 6, when accessing a network side device, a terminal sends, to the network side device, a frequency domain resource that can be sensed by the terminal and duration required for single sense. Subsequently, when needing to perform data transmission, the terminal sends a channel sense request to the network side device. After receiving the channel sense request, the network side device obtains the frequency domain resource that can be sensed by the terminal and the duration required for the single sense, and allocates, for the terminal, a sense resource 1 based on the frequency domain resource that can be sensed by the terminal and the duration required for single sense. The sense resource 1 is not a resource allocated by the network side device to each terminal in a cell in which the terminal is located to perform data transmission. The network side device notifies the terminal of the sense resource 1 using control information. After receiving the control information, the terminal performs channel sense on a sense resource, and after determining, based on a sense result, an idle frequency domain resource (or an idle frequency domain resource and an idle direction) on a frequency domain resource corresponding to the sense resource, sends a sense report on the determined idle frequency domain resource (or idle frequency domain resource and idle direction) after the sense resource 1. After receiving the sense report, the network side device allocates a transmission resource 2 to the terminal with reference to the sense report, and notifies the terminal of the transmission resource 2 using UL allocation. After receiving the UL allocation, the terminal performs data transmission on the transmission resource 2.

In conclusion, in a channel sense method shown in this embodiment of this application, the network side device determines, for the terminal, the sense resource used to perform channel sense, and the sense resource determined by the network side device for the terminal is another resource other than a resource that is allocated by the network side device to each terminal, which is in a same cell as the terminal, and that is used for data transmission. To be specific, when the terminal performs sense on the sense resource, another terminal in the same cell does not receive or send data on the sense resource. If the terminal senses an interference signal, it can be determined that the interference signal is not an interference signal generated when the other terminal in this cell performs data transmission. Therefore, the channel sense performed by the terminal can be prevented from being interfered with by the data transmission performed by the other terminal in the same cell, thereby improving accuracy of a sense result.

In a possible implementation, the terminal may send the sense result to the network side device. The network side device further determines, for the terminal with reference to the sense result, a resource used for the channel sense and a resource used for the data transmission, to improve accuracy of allocating, by the network side device, the resources used for the channel sense and the data transmission.

Figure 7:
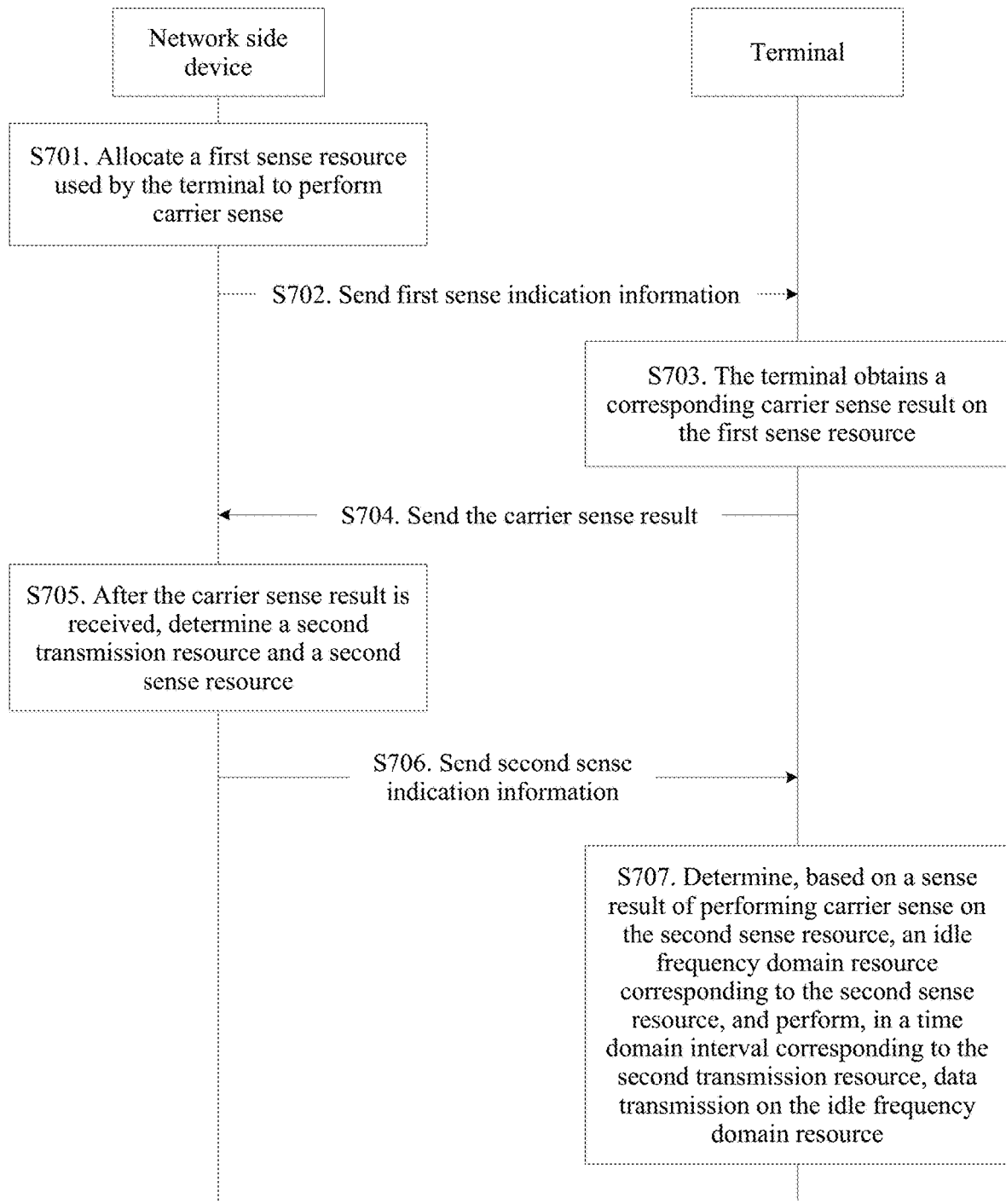
FIG. 7 is a flowchart of a channel sense method according to an example embodiment of this application.

FIG. 7 is a flowchart of a channel sense method according to an example embodiment of this application. The method may be applied to the communications system shown in FIG. 1. As shown in FIG. 7, the channel sense method may include the following steps.

Step 701: A network side device determines a first sense resource used by a terminal to perform channel sense, where the first sense resource is another resource other than a resource that is in a cell in which the terminal is located and that is used by each terminal to perform data transmission.

Step 702: The network side device sends first sense indication information to the terminal, and the terminal receives the first sense indication information, where the first sense indication information is used to indicate the first sense resource.

Step 703: The terminal obtains a corresponding channel sense result on the first sense resource.

For implementation processes of step 701 to step 703, refer to descriptions of the foregoing step 201 to the foregoing step 203 in the embodiment shown in FIG. 2. Details are not described herein again.

Step 704: The terminal sends the channel sense result to the network side device, and the network side device receives the channel sense result.

In a possible design, the first sense indication information is further used to obtain the channel sense result. The terminal determines, based on the channel sense result, an idle frequency domain resource corresponding to the first sense resource, and after a time domain interval corresponding to the first sense resource, sends the channel sense result to the network side device on the idle frequency domain resource corresponding to the first sense resource.

Step 705: after receiving the channel sense result, the network side device determines a second transmission resource used by the terminal to perform data transmission and a second sense resource.

In a possible design, the channel sense result includes at least one of a channel busy report and a channel idle report; the channel busy report includes at least one of sensed signal strength, signal power, duration, a number of a beam/sector on/in which a signal is sensed, and a number of an antenna on which a signal is sensed; and the channel idle report includes at least one of a number of an idle beam/sector and a number of an idle antenna. Correspondingly, the network side device may allocate the second transmission resource and the second sense resource to the terminal with reference to the foregoing channel idle report.

Step 706: The network side device sends second sense indication information to the terminal, where the second sense indication information is used to indicate the second transmission resource and the second sense resource; and the terminal receives the second sense indication information.

In a possible design, the network side device may add transmission indication information using control information sent by a downlink.

Step 707: The terminal determines, based on a sense result of performing channel sense on the second sense resource, an idle frequency domain resource corresponding to the second sense resource, and performs, in a time domain interval corresponding to the second transmission resource, data transmission on the idle frequency domain resource.

Figure 8:
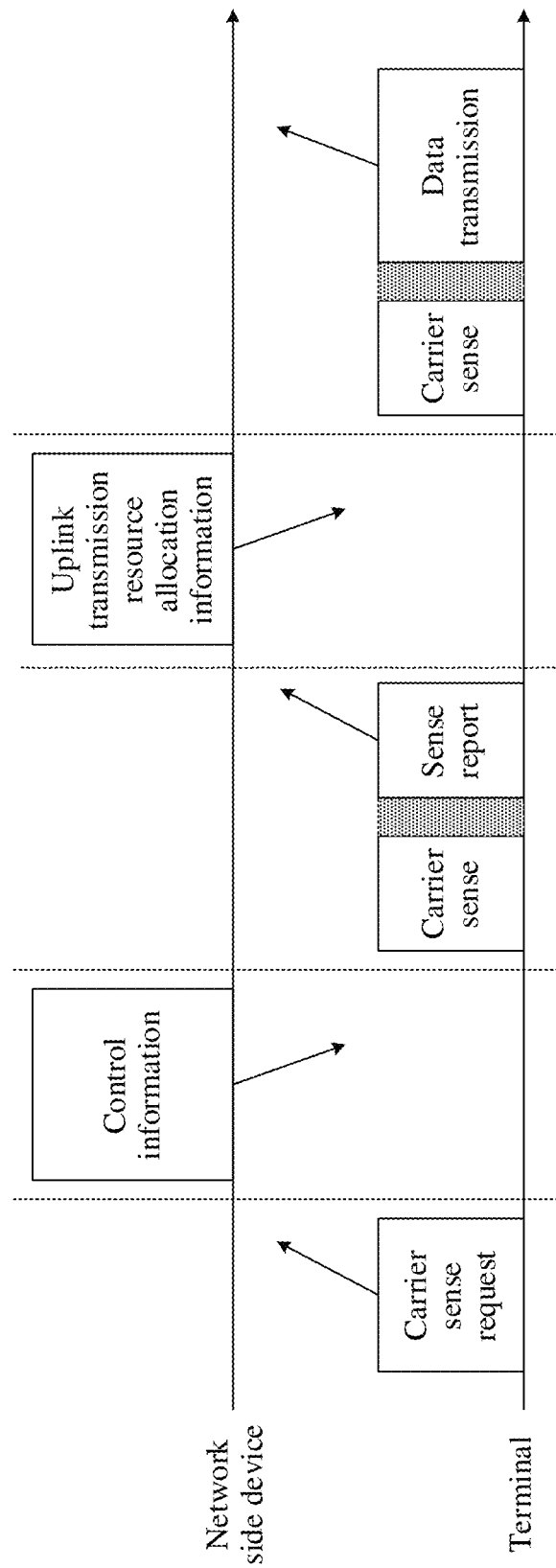
FIG. 8 is a schematic diagram of sense and transmission according to the embodiment shown in FIG. 7.

FIG. 8 is a schematic diagram of sense and transmission according to an embodiment of this application. As shown in FIG. 8, when accessing a network side device, a terminal sends, to the network side device, a frequency domain resource that can be sensed by the terminal and duration required for single sense. Subsequently, when needing to perform data transmission, the terminal sends a channel sense request to the network side device. After receiving the channel sense request, the network side device obtains the frequency domain resource that can be sensed by the terminal and the duration required for single sense, and allocates, for the terminal, a sense resource 1 based on the frequency domain resource that can be sensed by the terminal and the duration required for single sense. The sense resource 1 is not a resource allocated by the network side device to each terminal in a cell in which the terminal is located to perform data transmission. The network side device notifies the terminal of the sense resource 1 using control information. After receiving the control information, the terminal performs channel sense on a sense resource, and after determining, based on a sense result, an idle frequency domain resource (or an idle frequency domain resource and an idle direction) on a frequency domain resource corresponding to the sense resource, sends a sense report on the determined idle frequency domain resource (or idle frequency domain resource and idle direction) after the sense resource 1. After receiving the sense report, the network side device allocates a sense resource 2 and a transmission resource 3 to the terminal with reference to the sense report, and notifies the terminal of the sense resource 2 and a transmission resource 3 using UL allocation. After receiving the UL allocation, the terminal performs channel sense on the sense resource 2, determines an idle frequency domain resource (or an idle frequency domain resource and an idle direction) based on a channel sense result, and performs, in a time domain interval corresponding to the transmission resource 3, data transmission on the determined idle frequency domain resource (or idle frequency domain resource and idle direction).

In conclusion, in a channel sense method shown in this embodiment of this application, the network side device determines, for the terminal, the sense resource used to perform channel sense, and the sense resource determined by the network side device for the terminal is another resource other than a resource that is allocated by the network side device to each terminal, which is in a same cell as the terminal, and that is used for the data transmission. To be specific, when the terminal performs sense on the sense resource, another terminal in the same cell does not receive or send data on the sense resource. If the terminal senses an interference signal, it can be determined that the interference signal is not an interference signal generated when the other terminal in this cell performs data transmission. Therefore, the channel sense performed by the terminal can be prevented from being interfered with by the data transmission performed by the other terminal in the same cell, thereby improving accuracy of a sense result.

Figure 9:
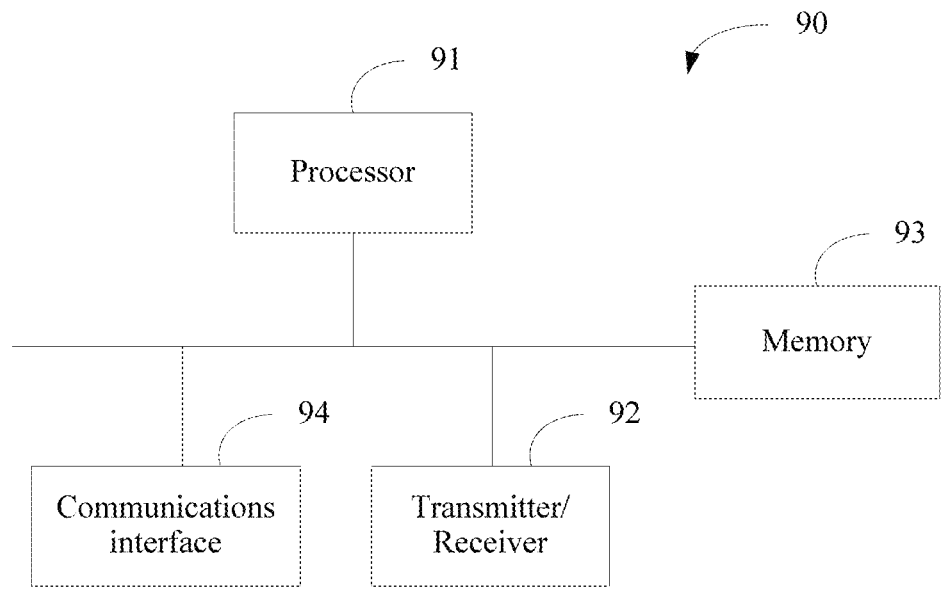
FIG. 9 is a schematic structural diagram of a network device according to an example embodiment of this application.

FIG. 9 is a schematic structural diagram of a network device according to an example embodiment of this application. The network device 90 may be the network side device 110 in the wireless communications system shown in FIG. 1.

The network device 90 may include a processor 91, a transmitter/receiver 92, a memory 93, and a communications interface 94.

The processor 91 may include one or more processing units; and the processing unit may be a central processing unit (CPU), a network processor (NP), or the like.

The transmitter/receiver 92 is configured to support wireless information transmission and receiving between the network device and the terminal in the foregoing embodiments. For example, the transmitter/receiver 92 may be an antenna module that supports at least one short range wireless communication manner (such as WIFI, ZIGBEE, or ultra-wideband) or a cellular network communication manner (such as 2G/3G/4G/5G).

The communications interface 94 is configured to support communication between the network device and another network side device, such as a core network device (for example, a mobility management entity) and a bearer network device (for example, a gateway device).

In an implementation, the processor 91 may be connected to the memory 93 and the communications interface 94 using a bus. The memory 93 may be configured to store a software program, and the software program may be executed by the processor 91, to implement the method steps that are in the embodiment shown in FIG. 2, FIG. 5 or FIG. 7 and that is performed by the network side device. In addition, the memory 93 may further store various types of service data or user data.

It may be understood that only a simplified design of the network device is shown in FIG. 9. In an embodiment application, the network device may include any quantities of the processors 91, the transmitters/receivers 92, the memories 93, and the communications interfaces 94.

Figure 10:
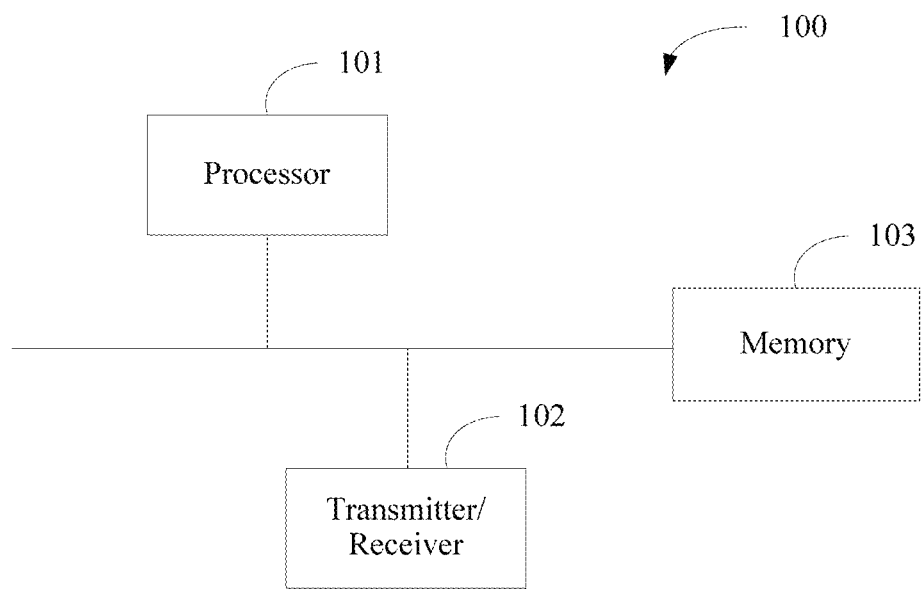
FIG. 10 is a schematic structural diagram of a network device according to an example embodiment of this application.

FIG. 10 is a schematic structural diagram of a network device according to an example embodiment of this application. The network device 100 may be the terminal 120 in the wireless communications system shown in FIG. 1.

The network device 100 may include a processor 101, a transmitter/receiver 102, and a memory 103.

The processor 101 may include one or more processing units; and the processing unit may be a CPU, a NP, or the like.

The transmitter/receiver 102 is configured to support wireless information transmission and receiving between the network device and the terminal in the foregoing embodiments. For example, the transmitter/receiver 102 may be an antenna module that supports at least one short range wireless communication manner (such as WIFI, ZIGBEE, or ultra-wideband) or a cellular network communication manner (such as 2G/3G/4G/5G).

In an implementation, the processor 101 may be connected to the memory 103 using a bus. The memory 103 may be configured to store a software program, and the software program may be executed by the processor 101, to implement the method steps that are in the embodiment shown in FIG. 2, FIG. 5 or FIG. 7 and that is performed by the terminal. In addition, the memory 103 may further store various types of service data or user data.

It may be understood that only a simplified design of the network device is shown in FIG. 10. In an embodiment application, the network device may include any quantities of the processors 101, the transmitters/receivers 102, and the memories 103.

Figure 11:
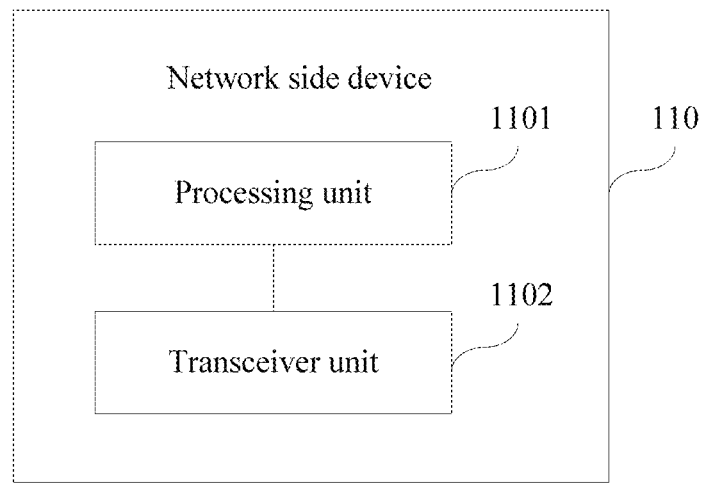
FIG. 11 is a structural block diagram of a network side device according to an embodiment of this application.

FIG. 11 is a structural block diagram of a network side device according to an embodiment of this application. The network side device may be the network side device 110 in the embodiment shown in FIG. 1. The network side device may include a processing unit 1101 and a transceiver unit 1102.

The processing unit 1101 is configured to implement steps, other than receiving and sending of related data or information, that are performed by the network side device in the embodiment shown in FIG. 2, FIG. 5, or FIG. 7, including but not limited to steps that are related to determining of a sense resource or transmission resource performed by the network side device and steps that are related to obtaining of sense capability information of a terminal performed by the network side device.

The transceiver unit 1102 is configured to implement a step of sending related data or information performed by the network side device in the embodiment shown in FIG. 2, FIG. 5, or FIG. 7 and a step of receiving related data or information performed by the network side device.

Figure 12:
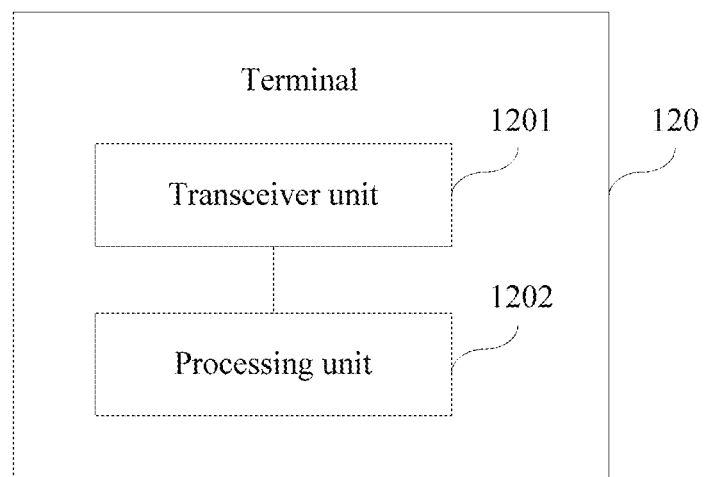
FIG. 12 is a structural block diagram of a terminal according to an embodiment of this application.

FIG. 12 is a structural block diagram of a terminal according to an embodiment of this application. The terminal may be the terminal 120 in the foregoing embodiment shown in FIG. 1. The terminal may include a transmitter unit 1201 and a processing unit 1202.

The transceiver unit 1201 is configured to implement a step of receiving related information performed by the terminal in the embodiment shown in FIG. 2, FIG. 5, or FIG. 7 and a step of sending related information performed by the terminal.

The processing unit 1202 is configured to implement other steps, other than receiving and sending of related data or information, that are performed by the terminal in the embodiment shown in FIG. 2, FIG. 5, or FIG. 7, including but not limited to steps that are related to obtaining of a sense result performed by the terminal and steps that are related to determining of an idle frequency domain resource (or determining of an idle frequency domain resource and an idle direction) performed by the terminal.

It should be noted that when the network side device and the terminal that are provided in the foregoing embodiments determine a sense resource or perform channel sense, division of the foregoing function units is merely an example. In an embodiment application, the foregoing functions can be allocated to different function units for implementation as required, to be specific, an inner structure of the device is divided into different function units, to implement all or some of the functions described above. In addition, the network side device and the terminal that are provided in the foregoing embodiments are based on the same concept as method embodiments of the channel sense method. For specific implementation processes of the network side device and the terminal, refer to the method embodiments. Details are not described herein again.

The sequence numbers of the foregoing embodiments of this application are merely for illustrative purposes, and are not intended to indicate priorities of the embodiments.

A person of ordinary skill in the art may understand that all or some of the steps that are of the foregoing embodiments and that are performed by the processor may be implemented by hardware or may be implemented by an instruction by controlling related hardware. The instruction may be stored in a computer readable storage medium. The computer readable storage medium mentioned above may be a read-only memory, a disk, a compact disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel sense method implemented by a terminal, comprising:
    receiving first sense indication information from a network side device, wherein the first sense indication information indicates a first sense resource, wherein the first sense resource is a first resource in a cell in which the terminal is located, and wherein the first sense resource is not for the terminal to perform data transmission; and
    obtaining a corresponding channel sense result on the first sense resource.

2. A network side device, comprising:
    a processor configured to determine a first sense resource for a terminal to perform channel sense, wherein the first sense resource is a first resource in a cell in which the terminal is located, and wherein the first sense resource is not for the terminal to perform data transmission; and
    a communications interface coupled to the processor and configured to send first sense indication information to the terminal, and wherein the first sense indication information indicates the first sense resource.

3. The network side device of claim 2, wherein the first sense indication information comprises:
    one or more timeslots occupied by the first sense resource; or
    a start time and a duration of the first sense resource.

4. The network side device of claim 2, wherein the first sense indication information indicates a first transmission resource for the terminal to perform the data transmission, wherein a time domain interval of the first transmission resource is after a second time domain interval of the first sense resource, and wherein a frequency domain resource occupied by the first transmission resource is all or a part of the frequency domain resource occupied by the first sense resource.

5. The network side device of claim 2, wherein the first sense indication information is for obtaining a channel sense result of the terminal, wherein the communications interface is further configured to receive the channel sense result from the terminal, and wherein the channel sense result corresponds to the terminal on the first sense resource.

6. The network side device of claim 5, wherein the channel sense result comprises at least one of a channel busy report or a channel idle report, wherein the channel busy report comprises at least one of sensed signal strength, signal power, duration, a number of a beam on which a signal is sensed, a number of a sector in which the signal is sensed, or a number of an antenna on which the signal is sensed, and wherein the channel idle report comprises at least one of a number of an idle beam, a number of an idle sector, or a number of an idle antenna.

7. The network side device of claim 5, wherein the processor is further configured to determine a second transmission resource used by the terminal to perform the data transmission after receiving the channel sense result from the communications interface, wherein the communications interface is further configured to send transmission indication information to the terminal, and wherein the transmission indication information indicates the second transmission resource.

8. The network side device of claim 5, wherein the processor is further configured to:
  determine a second sense resource for the terminal to perform the channel sense after receiving the channel sense result from the transceiver; and
  determine a second transmission resource for the terminal to perform data transmission after receiving the channel sense result, wherein a time domain interval of the second transmission resource is after a time domain interval of the second sense resource, wherein a frequency domain resource occupied by the second transmission resource is all of a frequency domain resource occupied by the second sense resource or a part of the frequency domain resource occupied by the second sense resource, wherein the communications interface is further configured to send second sense indication information to the terminal, and wherein the second sense indication information indicates the second sense resource and the second transmission resource.

9. The network side device of claim 2, wherein the processor is further configured to:
  obtain sense capability information of the terminal before determining the first sense resource for the terminal to perform the channel sense, wherein the sense capability information comprises at least one of a frequency domain resource that can be sensed or a duration required for single sense; and
  determine the first sense resource based on the sense capability information of the terminal when determining the first sense resource for the terminal to perform the channel sense.

10. A terminal, comprising:
  a processor; and
  a communications interface coupled to the processor and configured to receive first sense indication information from a network side device, wherein the first sense indication information indicates a first sense resource, wherein the first sense resource is a first resource in a cell in which the terminal is located, wherein the first sense resource is not for the terminal to perform data transmission, and wherein the processor is configured to obtain a corresponding channel sense result on the first sense resource.

11. The terminal of claim 10, wherein the first sense indication information indicates a first transmission resource for the terminal to perform the data transmission, wherein a time domain interval of the first transmission resource is after a second time domain interval of the first sense resource, wherein a frequency domain resource occupied by the first transmission resource is all or a part of the frequency domain resource occupied by the first sense resource, and wherein the processor is further configured to:
  determine, based on the channel sense result, an idle frequency domain resource that corresponds to the first transmission resource; and
  perform, in the time domain interval that corresponds to the first transmission resource, the data transmission on the idle frequency domain resource.

12. The terminal of claim 10, wherein the processor is further configured to:
  use the first sense indication information to obtain a channel sense result; and
  determine, based on the channel sense result, an idle frequency domain resource that corresponds to the first sense resource, wherein the communications interface is further configured to send, after a time domain interval that corresponds to the first sense resource, the channel sense result to the network side device on the idle frequency domain resource that corresponds to the first sense resource.

13. The terminal of claim 12, wherein the communications interface is further configured to receive transmission indication information from the network side device, wherein the transmission indication information indicates a second transmission resource after sending the channel sense result to the network side device, and wherein the transmission indication information is used for data transmission.

14. The terminal of claim 12, wherein the communications interface is further configured to receive second sense indication information from the network side device after sending the channel sense result, wherein the second sense indication information indicates a second sense resource and a second transmission resource, wherein a time domain interval of the second transmission resource is after a second time domain interval of the second sense resource, wherein a frequency domain resource occupied by the second transmission resource is all of a frequency domain resource occupied by the second sense resource or a part of the frequency domain resource occupied by the second sense resource, and wherein the processor is further configured to:
  determine, based on a sense result of performing channel sense on the second sense resource, a second idle frequency domain resource that corresponds to the second sense resource; and
  perform, in the time domain interval that corresponds to the second transmission resource, the data transmission on the second idle frequency domain resource.

15. The terminal of claim 10, wherein the communications interface is further configured to send sense capability information of the terminal to the network side device before receiving the first sense indication information from the network side device, and wherein the sense capability information comprises at least one of a channel interval that can be sensed or duration required for single sense.

16. The terminal of claim 11, wherein the processor is further configured to:
    perform channel sense on the first sense resource to obtain a channel sense result; or
    perform, before the time domain interval that corresponds to the first sense resource, the channel sense on the frequency domain resource occupied by the first sense resource to obtain the channel sense result.

17. The channel sense method of claim 1, wherein the first sense indication information indicates a first transmission resource used by the terminal to perform the data transmission, wherein a time domain interval of the first transmission resource is after a second time domain interval of the first sense resource, wherein a frequency domain resource occupied by the first transmission resource is all of a frequency domain resource occupied by the first sense resource or a part of the frequency domain resource occupied by the first sense resource, and wherein the channel sense method further comprises:
    determining, based on a channel sense result, an idle frequency domain resource that corresponds to the first transmission resource; and
    performing, in the time domain interval that corresponds to the first transmission resource, the data transmission on the idle frequency domain resource.

18. The channel sense method of claim 1, further comprising sending sense capability information of the terminal to the network side device before receiving the first sense indication information from the network side device, wherein the sense capability information comprises at least one of a channel interval that can be sensed or duration required for single sense.

19. The channel sense method of claim 1, further comprising:
    using the first sense indication information to obtain a channel sense result;
    determining, based on the channel sense result, an idle frequency domain resource that corresponds to the first sense resource; and
    sending, after a time domain interval that corresponds to the first sense resource, the channel sense result to the network side device on the idle frequency domain resource that corresponds to the first sense resource.

20. The channel sense method of claim 19, further comprising receiving transmission indication information from the network side device, wherein the transmission indication information indicates a second transmission resource after sending the channel sense result to the network side device, and wherein the transmission indication information is used for data transmission.

* * * * *